Oct. 17, 1933.                G. J. OLNEY                1,931,114
         DEVICE FOR ARRANGING AND FEEDING STRING BEANS OR THE LIKE
                    Filed Feb. 24, 1931         3 Sheets-Sheet 1
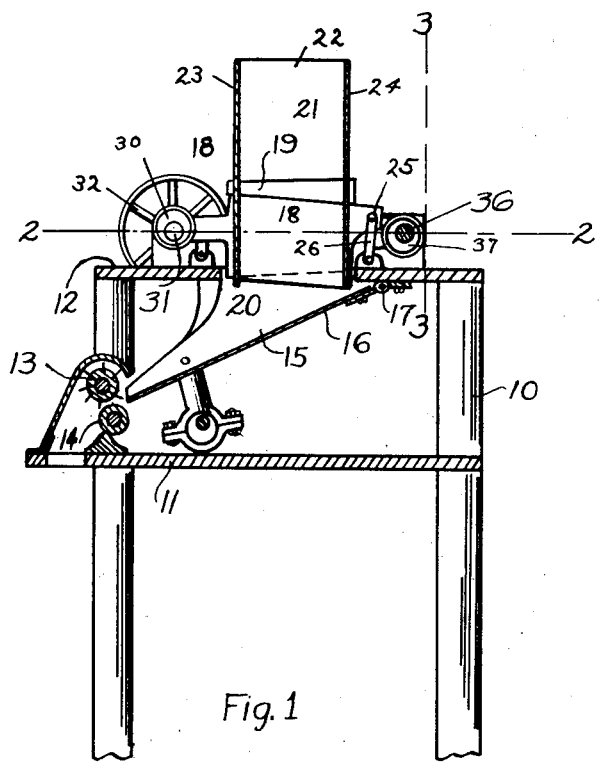
Fig. 1
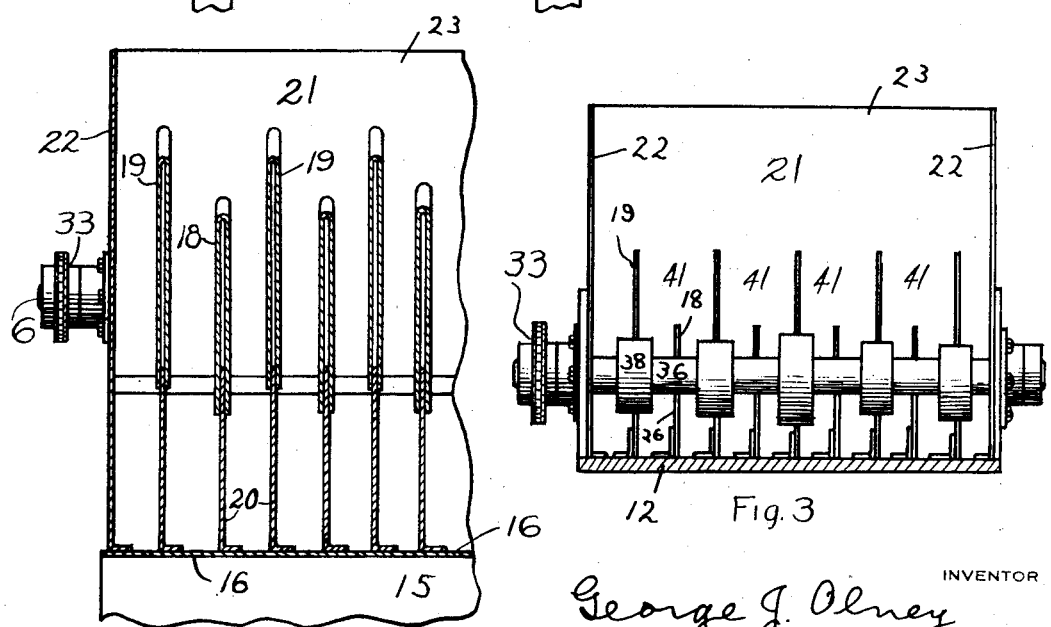
Fig. 5
Fig. 3
INVENTOR
George J. Olney
BY Martin & Rendell
ATTORNEYS Oct. 17, 1933.     G. J. OLNEY     1,931,114
DEVICE FOR ARRANGING AND FEEDING STRING BEANS OR THE LIKE
Filed Feb. 24, 1931     3 Sheets-Sheet 2
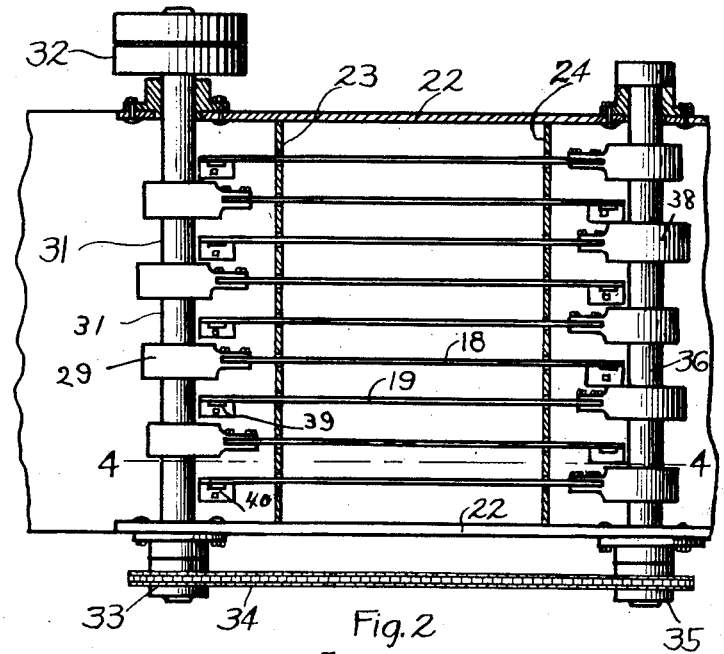
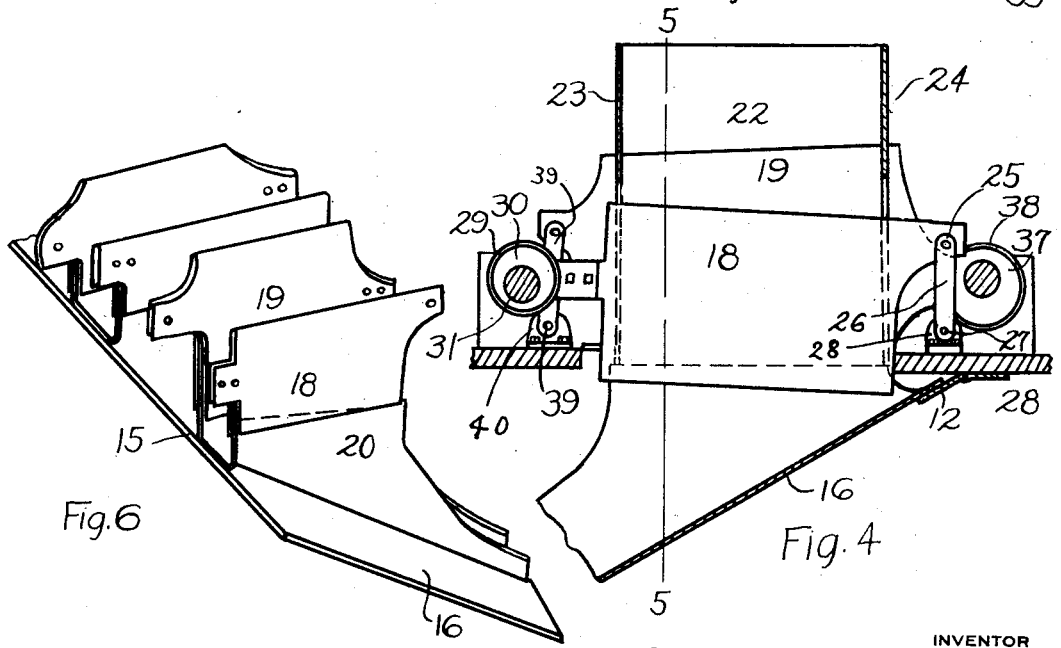
INVENTOR
George J. Olney
BY Martin & Rendell
ATTORNEYS Oct. 17, 1933.                    G. J. OLNEY                    1,931,114
            DEVICE FOR ARRANGING AND FEEDING STRING BEANS OR THE LIKE
                    Filed Feb. 24, 1931          3 Sheets-Sheet 3
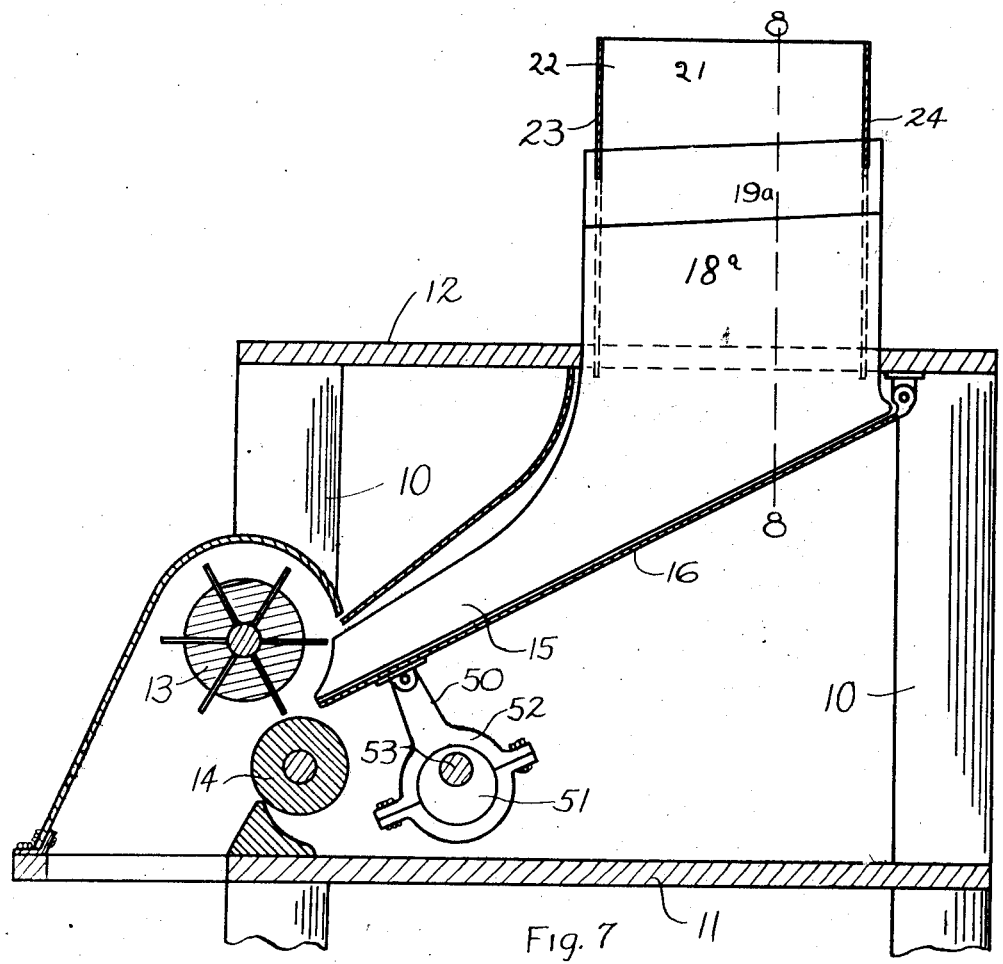
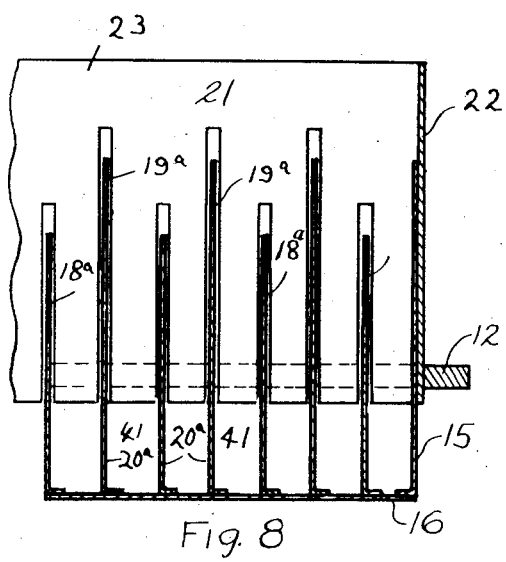
INVENTOR
George J. Olney
BY Martin & Rendell
ATTORNEYS Patented Oct. 17, 1933

1,931,114

UNITED STATES PATENT OFFICE 1,931,114

DEVICE FOR ARRANGING AND FEEDING STRING BEANS OR THE LIKE

George J. Olney, Westernville, N. Y.

Application February 24, 1931. Serial No. 517,810

6 Claims. (Cl. 198—30)

My present invention relates to a device for arranging string beans or similar articles lengthwise into rows.

The purpose of my invention is to provide a device and machine of the character mentioned which is simple and strong in construction, effective and durable in operation and well adapted to effectively and accurately arrange string beans that may be in an indiscriminate mass into rows with the beans extending longitudinally of the rows.

I have illustrated two forms of my device in connection with a string bean cutter of the type shown in the patent to Z. P. Townsend No. 925,614, issued June 22, 1909, but it will be understood that my invention is not limited to a string bean cutter of that particular type nor even to a string bean cutting machine, but that my invention may be broadly applied where articles more or less like string beans are to be sorted from an indiscriminate mass into adjacent rows with the articles in the different rows extending longitudinally of the rows.

In the said Townsend string bean cutter and in many other situations articles such as string beans are placed in a hopper having closely arranged longitudinally extending slots in the bottom thereof through which the string beans are supposed to drop into passageways in the chute which guide the beans lengthwise to the cutting device proper. In the machine referred to the slats in the bottom of the hopper forming the longitudinal slots leading to the chute readily become choked if the beans are placed in the hopper in an indiscriminate mass and heretofore such a machine has required the constant attention of an attendant to keep the beans loosened over these slots and to manually arrange the beans lengthwise of the slots so that they will fall between the slats and not choke up the opening to the chute.

The purpose of my invention is to provide a device for automatically and continuously arranging the beans lengthwise of said slots so that they may fall downward therethrough into the chute without the attention or assistance of an attendant.

Further purposes of my invention are to provide a device or machine of the character described wherein spaced partitions are provided in or partly in the lower part of the fixed hopper with their upper edges above the bottom of the hopper and with said partitions movable relative to the said hopper preferably with a combined up and down and longitudinal motion; with said partitions movable relative to the hopper and extending to different heights preferably alternately high and low; with said partitions both movable relative to said fixed hopper and of different heights; with said movable partitions arranged in sets and with the sets differently moved or moved at different times or in different sequence as for instance to have the high partitions descending while the low partitions are ascending and to have the high partitions ascending while the low partions are descending or to have alternate partitions moving in different directions.

Further objects and advantages of the invention will appear from the specification and claims herein.

Fig. 1 is a vertical sectional view of a string bean cutter of the Townsend type equipped with an arranging device embodying one form of my invention. Fig. 2 is a horizontal sectional view of said device on line 2—2 of Fig. 1 but on a somewhat enlarged scale. Fig. 3 is a vertical sectional view on line 3—3 of Fig. 1. Fig. 4 is a sectional view on line 4—4 of Fig. 2 and Fig. 5 is a sectional view on line 5—5 of Fig. 4. Fig. 6 is a separate perspective view of part of the chute and several of the separately movable partitions mounted thereon (in the form shown in Figs. 1-5), but without adjacent connecting parts. Fig. 7 is a view similar to Fig. 1 showing an arranging device embodying a modified form of my invention and Fig. 8 is a vertical sectional view on line 8—8 of Fig. 7.

Referring to the drawings in a more particular description and first to the form shown in Figs. 1 to 6, it will be seen that in Fig. 1 my sorting device is combined with or used with a string bean cutter of the so-called Townsend type. The machine so illustrated comprises a suitable framework having uprights 10 carrying a lower platform 11 and thereabove a table 12. Between said platform and table are mounted the parts of the string bean cutter proper comprising the cutter members, namely a blade-equipped roller 13 and an anvil roller 14 and a slanting chute 15 having a plurality of narrow vertically arranged passageways 41 formed by the upstanding walls 20 whereby the string beans are fed in a more or less continuous procession lengthwise to the cutting members 13 and 14. Ordinarily the chute 15 is given a rapid shaking or agitating movement so as to help the beans slide down the inclined chute passageways toward the cutting members. This movement of said chute is commonly obtained by hinging the upper or right hand end of the common bottom 16 of the chute to the table, the pivoting point of said hinges being at 17 to the right of the chute as seen in Fig. 1 while the cutting members as seen in said figure are to the left of the chute and at the lower end thereof.

Passing now to the part of the device which is new and more particularly embodies my invention, it will be seen that I provide a relatively small fixed hopper above the table 12 and in this hopper are movably mounted a plurality of spaced partitions preferably alternately low and high partitions 18 and 19 and that these partitions are in alignment with the intermediate walls 20 of the chute 15 upstanding from the common bottom 16 of said chute. In order that the beans will not catch between the aligned walls 20 and partitions 18 or 19 and so that the beans will not be cut or broken by being caught between said walls and said partitions I preferably form the partitions of two thicknesses of sheet metal spaced slightly apart and overlapping the upper end of the upstanding walls 20. Conveniently these partitions may be made as shown in Fig. 6 out of pieces of sheet metal twice the size of a desired partition with each piece of sheet metal folded so that the top of the partition presents a smooth edge and the bottom of the partition has its two parts on the opposite sides of the wall to be engaged thereby and slidingly or movably fitting thereon.

The partitions 18 and 19 extend from the upper edges of the upstanding walls 20 up into the lower part of the hopper 21 formed by the two opposite ends 22 parallel to the partitions 18 and 19 and spaced from the outermost of the said partitions and by the sides 23 and 24 to the left and right respectively of the hopper as seen in Figs. 1, 2, 4 and 5. Into the part of the hopper 21 above the partitions 18 and 19 are placed indiscriminately the string beans or other articles to be sorted as by emptying them from a container or by directing the delivery end of a carrier into said hopper.

The said partitions are arranged in a plurality of series conveniently two series, one series consisting of the low partitions 18 and the other series consisting of the high partitions 19. The different series have their upper edges at different heights which would of itself tend to help in arranging the string beans longitudinally into the passageways between the adjacent partitions so as to allow the beans to fall into the chute passageways therebelow. Furthermore, the different partitions are being given a rather rapid movement which movement preferably combines an up and down movement and a longitudinal movement. Furthermore, the two series of partitions are preferably being moved at any one time in different directions which motion and difference of direction of motion further helps to keep any of the beans from lodging or staying crosswise of the upper edges of the partitions and tends to throw the beans around lengthwise into the passageways between the partitions. A convenient and the preferred form of providing said partitions in a plurality of series with a different motion between the two series is shown in the drawings and will now be described. The sectional view, Fig. 4 shows a side elevation of one of the low partitions 18. The right hand end of each low partition 18 outside the right hand side 24 of the hopper is pivotally connected as at 25 to the upper end of a link 26 the lower end of which is in turn pivotally connected as at 27 to upstanding ears 28 provided upon the upper surface of the table 12 to the right of the hopper.

It will be understood that all of the partitions both low partitions 18 and high partitions 19 extend out through upright slots provided in alignment therewith in both the left hand side 23 and the right hand side 24 of the hopper so that at no position of any of said partitions will there be opportunity for the articles being sorted to be caught between the ends of the partitions and the said side walls 23 and 24.

The left hand end of each low partition 18 is provided with a collar 29 engaging an eccentric wheel 30 mounted on shaft 31. On this shaft are located all of the eccentric wheels for this low set of partitions. The shaft 31 is driven through a belt not shown which engages a pulley 32 on the farther side of the machine as seen in Figs. 1 and 2. On the near end of this shaft is mounted sprocket wheel 33 from which sprocket chain 34 extends to sprocket wheel 35 on shaft 36 suitably mounted at the right hand side of the machine as shown in Figs. 1, 2, 4 and 5 just above the table 12 and slightly to the right of the links 26 which support the right hand ends of the low partitions 18.

Upon this shaft 36 are mounted a series of eccentric wheels 37 in alignment with the high partitions 19, each eccentric 37 being engaged by a suitable collar 38 secured to the end of the high partition which projects to the right of the right wall or side 24 of the hopper as particularly seen in Fig. 4. The opposite or left hand end of each of the high partitions 19 is pivotally connected to the upper end of an upstanding link 39 the lower end of which is in turn pivotally connected to an ear 40 provided upon the upper surface of the table 12 to the left of the hopper.

It will now be seen that when the machine is in operation the low partitions 18 will have imparted to their left hand ends a movement from the eccentric wheels 30 which movement includes a combination of up and down movement and a movement from right to left. The pivoted and linked connection at the other end of these partitions allows such combined motions. The partition will swing on its pivotal connection with the link and the link in turn will swing back and forth on its connection with the shoulders as required to permit the movement from side to side.

Similarly it will be seen that when the machine is in operation the high partitions 19 will have imparted to their right hand ends a movement from the eccentric wheels 37 which movement includes a combination of up and down movement and a movement from right to left. The pivoted and link connection at the other end of these high partitions in an obvious manner allows such motions.

It will now be seen that in the embodiment of my machine already described and shown in Figs. 1 to 6, the upstanding partitions quickly, regularly and with certainty and effectiveness will sort the beans or other articles placed into the top of the hopper in an indiscriminate mass into several rows with the articles in each row extending longitudinally. The difference in the height of adjacent partitions helps greatly in this arranging process because the high partitions are too far apart to allow a bean to extend from the top of one high partition to the top of another high partition and the high partitions tend to make the beans fall through on one side or the other of the high partition. Even if the bean has become placed across a high and a low partition it will ordinarily roll or slide until one end of the bean moves from its support and the bean will then fall into one of the spaces between two partitions. Moreover, it will be seen that this sorting operation is greatly aided through the fact that the partitions are being constantly agitated preferably with a combined up and down and longitudinal movement. In the form of my invention so far described the movement of the partitions is different or differently timed as to the adjacent partitions or as to the high or low partitions and so the beans are more quickly and more certainly prevented from lodging across the top of the partitions and brought into alignment with the spaces between the partitions.

Turning now to the form of my invention shown in Figs. 7 to 8, it will be seen that in this construction alternately low and high partitions 18ª and 19ª are still used and that these partitions have a movement up and down in the hopper but that instead of the high and low partitions moving differently or at different times, all the partitions, that is both the high and the low partitions move at the same time and to the same extent. With this simplification in movement it is possible to have the partitions 18ª and 19ª formed as upward extensions, preferably integral extensions, upon the side walls 20ª of the several passageways 41 which below the table 12 convey the beans or other articles lengthwise to the cutting machine proper already described or to any other machine or device with which this arranging mechanism may be used. Accordingly in the form of the arranging device shown in Figs. 7 and 8 the common bottom 16 has mounted thereon high U-shaped members, the two upstanding portions of which form two adjacent walls 20ª of the chute and each of these walls is extended upwardly preferably integral therewith into the lower part of the hopper which upward extensions form the low partitions 18ª and the high partitions 19ª in said hopper. As already mentioned the high and low partitions will have their opposite ends extend out through narrow upright slots in the opposite sides 23 and 24 of the hopper. By having the ends of the partitions so extend through the side walls there is no opportunity for beans or other articles being handled to become caught between the ends of the moving partitions and the side walls.

It will be understood that movement to the low and high partitions 18ª and 19ª respectively will be imparted through the means which moves the walls of chute 15 mounted upon the common bottom 16, said common bottom being hingedly or pivotally mounted at its upper right hand end as seen in Fig. 7. The lower or left hand end thereof is pivotally connected to two arms 50 the lower end of which is formed with or provided with eccentric collars 51 each of which respectively engage an eccentric wheel 52 located at the opposite ends of the shaft 53 which shaft is power-driven.

It will now be seen that in operation the high and low partitions even when moved in unison will still operate to sort the beans into the different spaces between adjacent partitions and that the movement given to these partitions will be sufficient to prevent the beans from staying lodged across the upper edges of adjacent partitions.

What I claim as new and desire to secure by Letters Patent is:

1. In a device for arranging string beans or the like lengthwise into rows and for feeding said rows lengthwise, the combination of a fixed, open-bottomed hopper to receive the articles indiscriminately, an inclined, reciprocatingly-mounted chute having the bottom of its upper end beneath and spaced from said hopper and having spaced upstanding division walls forming narrow inclined passageways for feeding the beans lengthwise, partitions movably mounted in the lower part of said hopper and spaced similar to and vertically aligned with but independent of, the said division walls and means for moving said partitions relative to said hopper and in vertical alignment with said division walls of the chute.

2. In a device for arranging string beans or the like lengthwise into rows and for feeding said rows lengthwise, the combination of a fixed, open-bottomed hopper to receive the articles indiscriminated, an inclined, reciprocatingly-mounted chute having the bottom of its upper end beneath and spaced from said hopper and having spaced upstanding division walls forming narrow inclined passageways for feeding the beans lengthwise, partitions movably mounted in the lower part of said hopper and spaced similar to and vertically aligned with but independent of the said division walls and means for moving said partitions vertically relative to said hopper and in a direction lengthwise of said partitions and in vertical alignment with said division walls of the chute.

3. In a device for arranging string beans or the like lengthwise into rows and for feeding said rows lengthwise, the combination of a fixed, open-bottomed hopper to receive the articles indiscriminately, an inclined, reciprocatingly-mounted chute having the bottom of its upper end beneath and spaced from said hopper and having spaced upstanding division walls forming narrow inclined passageways for feeding the beans lengthwise, partitions movably mounted in the lower part of said hopper and spaced similar to and vertically aligned with the said division walls therebelow but separate from said walls and means separate from said chute for moving said partitions relative to the hopper and in vertical alignment with said walls.

4. In a device for arranging string beans or the like lengthwise into rows and for feeding said rows lengthwise, the combination of a fixed, open-bottomed hopper to receive the articles indiscriminately, an inclined, reciprocatingly-mounted chute having the bottom of its upper end beneath and spaced from said hopper and having spaced upstanding division walls forming narrow inclined passageways for feeding the beans lengthwise, partitions movably mounted in the lower part of said hopper and spaced similar to and vertically aligned with the said division walls therebelow but separate from said walls and means separate from said chute for moving said partitions relative to the hopper and in vertical alignment with said walls, the upper edges of adjacent partitions being at different levels.

5. In a device for arranging string beans or the like lengthwise into rows and for feeding said rows lengthwise, the combination of a fixed, open-bottomed hopper to receive the articles indiscriminately, an inclined, reciprocatingly-mounted chute having the bottom of its upper end beneath and spaced from said hopper and having spaced upstanding division walls forming narrow inclined passageways for feeding the beans lengthwise, partitions movably mounted in the lower part of said hopper and spaced similar to and vertically aligned with the said division walls therebelow but separate from said walls and means separate from said chute for moving said partitions relative to the hopper and in vertical alignment with said walls, adjacent partitions being moved differently.

6. In a device for arranging string beans or the like lengthwise into rows and for feeding said rows lengthwise, the combination of a fixed, open-bottomed hopper to receive the articles indiscriminately, an inclined, reciprocatingly-mounted chute having the bottom of its upper end beneath and spaced from said hopper and having spaced upstanding division walls forming narrow inclined passageways for feeding the beans lengthwise, partitions movably mounted in the lower part of said hopper and spaced similar to and vertically aligned with the said division walls therebelow but separate from said walls and means separate from said chute for moving said partitions relative to the hopper and in vertical alignment with said walls, said partitions being in two series with adjacent partitions in different series and said two series being timed to move differently.

GEORGE J. OLNEY.